(12) United States Patent
Yagi et al.

(10) Patent No.: US 7,919,212 B2
(45) Date of Patent: Apr. 5, 2011

(54) SEPARATOR FOR FUEL CELLS

(75) Inventors: Hiroshi Yagi, Tokyo (JP); Tooru Serizawa, Tokyo (JP); Yasuhiro Uchida, Tokyo (JP); Koichi Suzuki, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 991 days.

(21) Appl. No.: 11/697,454

(22) Filed: Apr. 6, 2007

(65) Prior Publication Data

US 2007/0238005 A1    Oct. 11, 2007

(30) Foreign Application Priority Data

Apr. 11, 2006  (JP) ................. 2006-108631

(51) Int. Cl.
- *H01M 2/20* (2006.01)
- *H01M 8/24* (2006.01)
- *H01M 4/64* (2006.01)
- *H01M 4/66* (2006.01)

(52) U.S. Cl. ........ 429/468; 429/467; 429/469; 429/517; 429/518; 429/519; 429/522

(58) Field of Classification Search .......... 429/34, 429/35, 247, 468, 467, 469, 517, 518, 519, 429/522

See application file for complete search history.

(56) References Cited

U.S. PATENT DOCUMENTS 6,660,419 B1 * 12/2003 Nishida et al. ............ 429/32

OTHER PUBLICATIONS

U.S. Appl. No. 11/948,212, filed Nov. 30, 2007, Maeda, et al.
U.S. Appl. No. 10/477,600, filed Nov. 13, 2003, Maeda, et al.
U.S. Appl. No. 10/584,902, filed Jun. 28, 2006, Serizawa, et al.
U.S. Appl. No. 11/695,196, filed Apr. 2, 2007, Uchida, et al.
U.S. Appl. No. 11/793,595, filed Jun. 21, 2007, Yagi, et al.

* cited by examiner

Primary Examiner — Patrick Ryan
Assistant Examiner — Julian Mercado
(74) Attorney, Agent, or Firm — Oblon, Spivak, McClelland, Maier & Neustadt, L.L.P.

(57) ABSTRACT

The object of the invention is to provide a separator for fuel cells which is of improved strength and corrosion resistance and facilitates the assembling of unit cells. The separator comprises an electrically conductive resin layer formed by electrodeposition in such a way as to cover a metal substrate and a gasket component. The resin layer contains an electrically conductive material. The separator of the invention has thus an enhanced corrosion resistance, makes some considerable improvements in the assembling work efficiency of unit cells, and makes sure higher strength because of the use of the metal substrate.

16 Claims, 14 Drawing Sheets

SEPARATOR FOR FUEL CELLS

BACKGROUND OF THE INVENTION

The present invention relates generally to a separator for fuel cells, and more particularly to a separator used between unit cells in a fuel cell built up of a plurality of unit cells connected together, each with electrodes located on both sides of a solid polymer electrolyte membrane.

Briefly, a fuel cell is a device wherein fuel (a reducing agent) and oxygen or air (an oxidizing agent) are continuously supplied to it from outside for electrochemical reactions through which electric energy is taken out, and classified depending on its working temperature, the type of the fuel used, its applications, etc. Recently developed fuel cells are generally broken down into five types depending primarily on the type of the electrolyte used: a solid oxide type fuel cell, a melt carbonate type fuel cell, a phosphoric acid type fuel cell, a solid polymer electrolyte type fuel cell, and an alkaline aqueous solution type fuel cell.

These fuel cells use hydrogen gas resulting from methane or the like as fuel. More recently, a direct methanol type fuel cell (sometimes abbreviated as DMFC) relying on direct use as fuel of a methanol aqueous solution has been known in the art, too.

Among others, attention has now been directed to a solid polymer type fuel cell (hereinafter also abbreviated as PEFC) having a structure wherein a solid polymer membrane is held between two catalysts and these components are further sandwiched between a gas diffusion layer (GDL) and separators.

To get around leakage problems with this PEFC, for instance, to prevent the fuel and oxidizing agent gas feeds from leaking out or being mixed, gasket members are located in such a way as to sandwich the polymer electrolyte membrane between them around the electrodes and these components are held between the separators (JP-A2005-191002).

For the separators, moldings comprising carbon and resins or metal materials coated with a metal thin film of high corrosion resistance are used (JP-A2005-2411).

With the gasket members separate from the separators, polymer electrolyte membranes and electrodes, however, there is a problem in that the assembly work efficiency of unit cells using these components goes worse.

There are some limits to making separators comprising moldings thin, and with separators comprising a metal material coated with a noble metal thin film of high corrosion resistance such as a gold one, there is a problem in that the metal material is exposed in section, rendering cracks likely to occur at the interface between the metal material and the metal thin film.

DISCLOSURE OF THE INVENTION

A primary object of the invention is to provide a separator for fuel cells that is by far more improved in terms of strength and corrosion resistance, and facilitates the assembling of unit cells.

According to the invention, such an object is achieved by the provision of a separator for fuel cells, comprising a metal substrate, an electrically conductive resin layer formed by electrodeposition in such a way as to cover said metal substrate, and a gasket component, wherein said resin layer contains an electrically conductive material.

In one embodiment of the invention, said gasket component comprises a shim portion that is a height adjustment member and a seal portion that is a gas leakage-preventive member.

In another embodiment of the invention, there are multiple such seal portions provided.

In yet another embodiment of the invention, said metal substrate has a groove in at least one surface, and said gasket component is positioned outside an area with said groove formed therein.

In a further embodiment of the invention, said metal substrate has a plurality of through-holes, and said gasket component is positioned outside an area with said through-holes formed therein.

In a further embodiment of the invention, said resin layer is interleaved between said gasket component and said metal substrate.

In a further embodiment of the invention, there is none of said resin layer interleaved between said gasket component and said metal substrate, and said metal substrate is exposed at a side end.

In a further embodiment of the invention, said metal substrate is made of any one of stainless, iron, an iron-nickel alloy, aluminum, an aluminum alloy, copper, a copper alloy, titanium, a titanium alloy, magnesium, and a magnesium alloy.

In a further embodiment of the invention, said electrically conductive material is at least one of a carbon particle, a carbon nanotube, a carbon nanofiber, a carbon nanohorn, and a corrosion-resistant metal.

With such a separator of the invention wherein the resin layer containing an electrically conductive material is formed by electrodeposition onto the metal substrate, there is an improved corrosion resistance achievable, because the resin layer is coated all over the surface of the metal substrate, for instance, even when the metal substrate has grooves or through-holes. Integral provision of the gasket components brings about some considerable improvements in the assembly work efficiency of unit cells. Further, the use of the metal substrate makes sure an enhanced strength, and the absence of any noble metal helps cut down on fabrication costs. When the resin layer is interleaved between the gasket component and the metal substrate, the corrosion resistance becomes much better. When there is none of the resin layer interleaved between the gasket component and the metal substrate, on the other hand, it is possible to achieve material cost reductions for the formation of the resin layer by electrodeposition, and improve the adhesion of the gasket component to the metal substrate. Further, due to the fact that a site of the metal substrate not coated with the resin layer is left as a collector portion, it is possible to achieve lower resistance and boost up electricity production capability. As the gasket component comprises a shim portion that is a height adjustment member and a seal portion that is a gas leakage-preventive member, it allows the gas seal capability of the unit cell to be much more enhanced, and makes the assembling of unit cells much easier as well.

BRIEF EXPLANATION OF THE DRAWINGS

FIGS. 12A, 12B, 12C and 12D are illustrative of one fabrication process for the separator according to the invention.

EXPLANATION OF THE PREFERRED EMBODIMENTS

Figure 1:
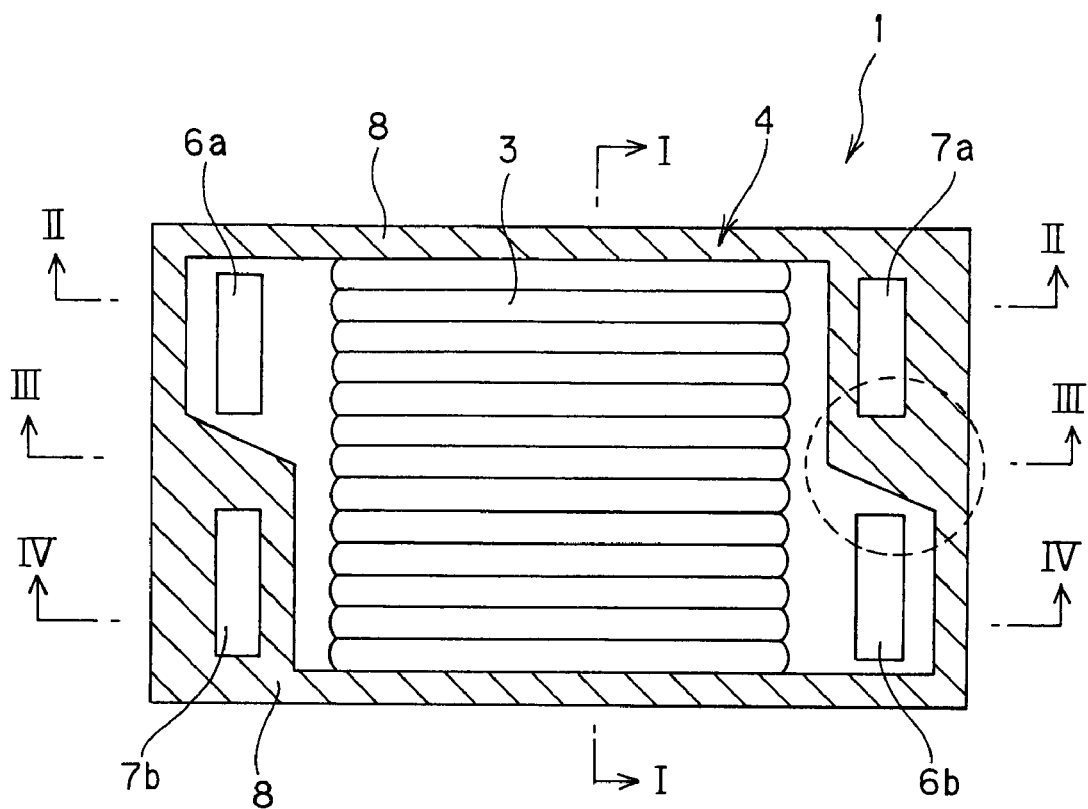
FIG. 1 is a plan view illustrative of one embodiment of the separator for fuel cells according to the invention.

The present invention is now explained with reference to some embodiments shown in the drawings.

[Separator]

Figure 2:
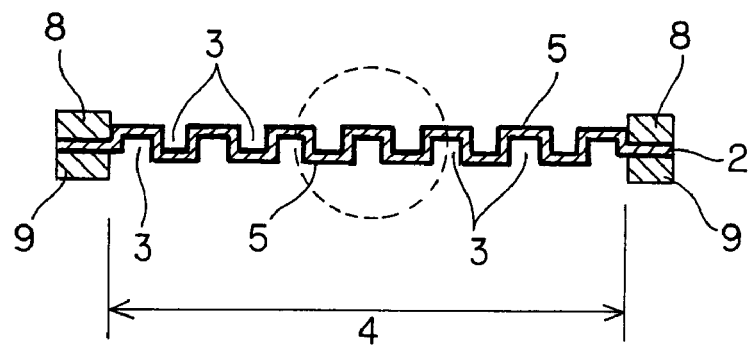
FIG. 2 is a sectional view of the separator of FIG. 1 as taken on line I-I.
Figure 3:
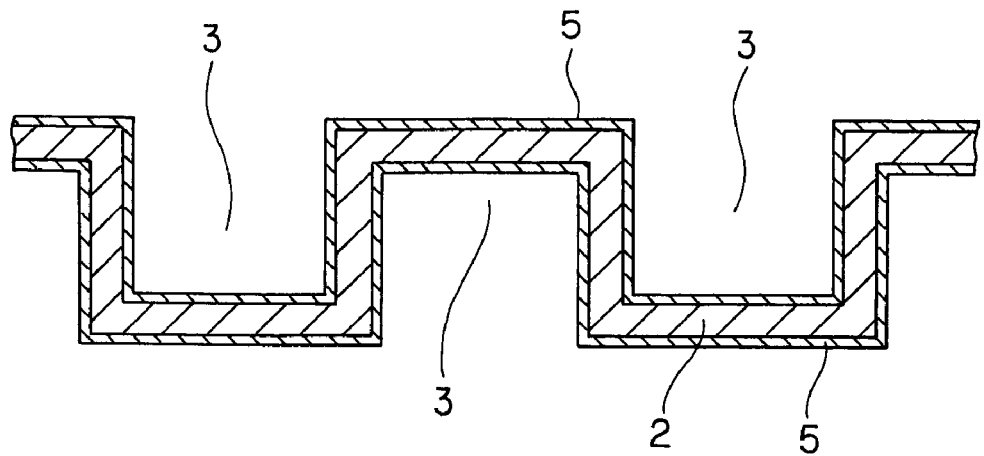
FIG. 3 is a partly enlarged view for a site marked off with a chain line in FIG. 2.
Figure 4:
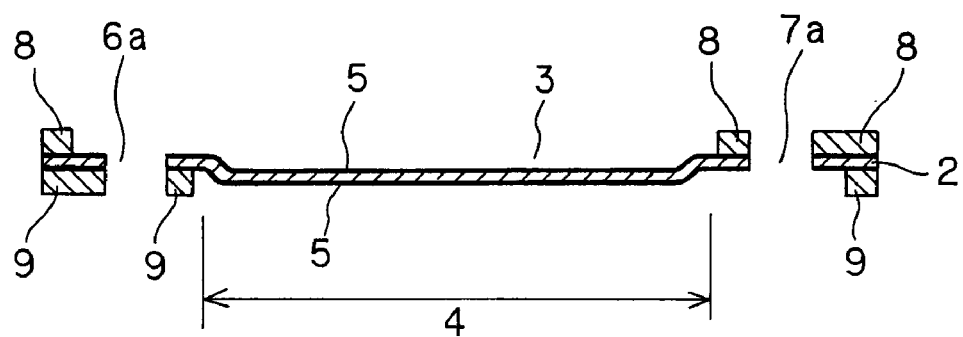
FIG. 4 is a sectional view of the separator of FIG. 1 as taken on line II-II.
Figure 5:
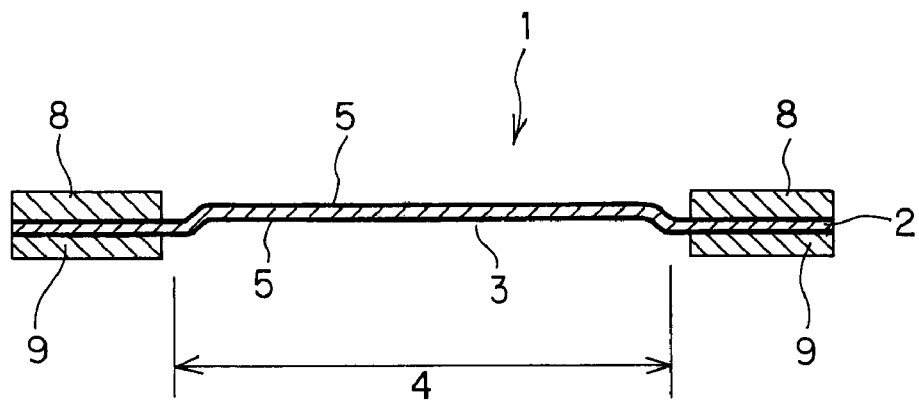
FIG. 5 is a sectional view of the separator of FIG. 1 as taken on line III-III.
Figure 6:
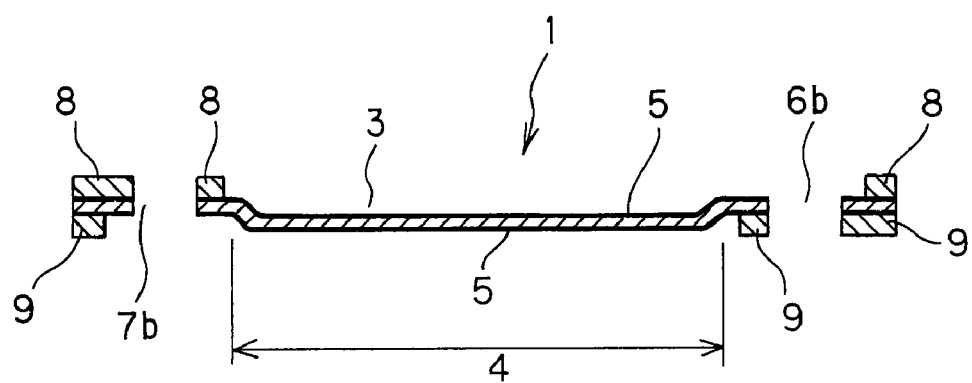
FIG. 6 is a sectional view of the separator of FIG. 1 as taken on line IV-IV.

FIG. 1 is a plan view illustrative of one embodiment of the separator for fuel cells according to the invention; FIG. 2 is a sectional view of the separator of FIG. 1 as taken on line I-I; and FIG. 3 is a partly enlarged view for a site marked off with a chain line in FIG. 2. FIG. 4 is a sectional view of the separator of FIG. 1 as taken on line II-II; FIG. 5 is a sectional view of the separator of FIG. 1 as taken on line III-III; and FIG. 6 is a sectional view of the separator of FIG. 1 as taken on line IV-IV. Referring to FIGS. 1-6, the separator 1 of the invention comprises a metal substrate 2, grooves 3 formed in both surfaces of the metal substrate 2, and a resin layer 5 formed by electrodeposition in such a way as to cover the two surfaces of the metal substrate 2, and further comprises gasket components 8, 9 (indicated by hatches in FIG. 1) in an integral way. The resin layer 5 contains an electrically conductive material, and the gasket components 8, 9 are positioned outside an area 4 with the grooves 3 formed in it. The separator 1 comprises two fuel gas inlet holes 6a, 6b and two oxidizing agent gas inlet holes 7a, 7b.

Preferably, the metal substrate 2 that forms a part of the separator 1 is made of a material having good electrical conductivity, desired strength, and good processing capability. For instance, there is the mention of stainless, iron, iron-nickel alloys, aluminum, aluminum alloys, copper, copper alloys, titanium, titanium alloys, magnesium, and magnesium alloys.

The grooves 3 that the metal substrate 2 has are now explained. When the separator 1 is built in a polymer electrolyte type fuel cell, one of the grooves defines a fuel gas feed groove for feeding fuel gas to one of the adjoining unit cells, and another defines an oxidizing agent gas feed groove for feeding oxidizing agent gas to another of the adjoining unit cells. Alternatively, one of the grooves 3 may provide either of the fuel gas and oxidizing agent gas feed grooves, and another may provide a cooling water groove. In the embodiment of FIG. 1, the grooves 3 are formed in such a way as to be connected to two fuel gas inlet holes 6a, 6b, providing fuel gas feed grooves. Note here that the grooves 3 may be formed in only one surface of the metal substrate 2.

There is no particular limitation to the configuration of such grooves 3: they may be configured in a continuous zigzag form, comb form, or other form. Likewise, there is no particular limitation to depth, width and sectional shape. The metal substrate 2 may also have grooves 3 of different shapes in its front and back surfaces. While it is shown in FIGS. 2 and 3 that the area 4 with the grooves 3 formed in it is of wave form in its sectional structure, it is contemplated that such area 4 may have a structure with grooves engraved in both surfaces of a plate form of metal substrate.

The resin layer 5 that forms a part of the separator 1 has electrical conductivity, and is to provide the metal substrate 2 with corrosion resistance. The resin layer 5 may be formed by dispersing an electrically conductive material and a water repellent material in a variety of anionic or cationic, synthetic polymer resins capable of electrodeposition to prepare an electrodeposition solution, forming it into a film by means of electrodeposition, and curing the film.

The anionic, synthetic polymer resin here, for instance, includes acrylic resin, polyester resin, maleated oil resin, polybutadiene resin, epoxy resin, polyamide resin, and polyimide resin, which may be used alone or in any desired admixture of two or more. These anionic, synthetic polymer resins may also be used in combination with crosslinkable resins such as melamine resin, phenol resin, and urethane resin. On the other hand, the cationic, synthetic polymer resin, for instance, includes acrylic resin, epoxy resin, urethane resin, polybutadiene resin, polyamide resin, and polyimide resin, which may be used alone or in any desired admixture of two or more. These cationic, synthetic polymer resins may also be used in combination with crosslinkable resins such as polyester resin, and urethane resin.

To impart adhesiveness to the aforesaid synthetic polymer resin having electrodeposition capability, adhesiveness-imparting resins such as rosin resin, terpene resin, and petroleum resin may be added to it, if required.

Such synthetic polymer resins having electrodeposition capability are used for electrodeposition while they are neutralized by alkaline or acidic substances in such a way as to be dissolved or dispersed in water. More exactly, the synthetic polymer resin of anionic nature is neutralized by amines such as trimethylamine, diethylamine, dimethylethanolamine, and diisopropanolamine or inorganic alkalis such as ammonia, and caustic potash. The synthetic polymer resin of cationic nature is neutralized by acids such as formic acid, acetic acid, propionic acid, and lactic acid. The neutralized water-soluble polymer resin is used in the form of a water-dispersion type or water-dissolution type while it is diluted by water.

The resin layer 5 formed by electrodeposition may have a thickness of 0.1 to 100 μm, preferably 3 to 30 μm. As the thickness of the resin layer 5 is below 0.1 μm, it often renders it impossible to make sure good corrosion resistance due to the occurrence of pinholes or the like, and a thickness exceeding 100 μm is not preferable, because of such problems as the occurrence of cracking after drying and solidification, poor productivity, and added costs.

The electrically conductive material contained in the resin layer 5, for instance, includes carbon materials such as carbon particles, carbon nanotubes, carbon nanofibers, and carbon nanohorns, and corrosion-resistant metals. However, the invention is not necessarily limited to such materials: any other material having the desired acid resistance and electrical conductivity may be used. Fine fiber-form carbon materials such as carbon nanotubes, carbon nanofibers, and carbon nanohorns are found to be best suited for imparting electrical conductivity to the resin layer 5. The resin layer 5 may contain such a conductive material in an appropriate amount determined depending on the conductivity demanded for the resin layer 5, for instance, in an amount of 30 to 90% by weight.

It is here noted that the fine fiber-form carbon materials such as carbon nanotubes, carbon nanofibers, and carbon nanohorns are supposed to be a promising material for various applications such as composite materials, and electronic devices, and when they are used as fillers for composite materials, it is possible to impart their physical properties to the composite materials. For instance, carbon nanotubes are improved in terms of electrical conductivity, acid resistance, processing capability, mechanical strength or the like, so that when used as fillers for composite materials, such carbon nanotubes' improved physical properties may be imparted to the composite materials.

The gasket components 8, 9 that form a part of the separator 1 are provided to prevent the fuel gas and oxidizing agent gas feeds from leaking out or being mixed together when the separator 1 is built in a fuel cell. Such gasket components 8, 9 are located on the peripheral edge of the separator 1 in such a way as to surround the center of the separator 1. In the embodiment shown in FIGS. 1-6, the gasket component 8 is positioned outside the aforesaid area 4 with the grooves 3 formed in it, and outside where the two fuel gas inlet holes 6a, 6b connected to the grooves 3 are located. Accordingly, the two oxidizing agent gas inlet holes 7a, 7b are positioned within the area with the gasket component 8 formed at it. On the opposite surface of the separator 1, on the other hand, the gasket component 9 is positioned at an area outside the aforesaid area 4 with the grooves 3 formed in it, and outside the two oxidizing agent gas inlet holes 7a, 7b connected to the grooves 3. Accordingly, the two fuel gas inlet holes 6a, 6b are positioned within the area with the gasket component 9 formed in it.

The gasket components 8, 9 may be made of a material including but not being not limited to a rubber material such as silicone rubber, fluororubber, and nitrile rubber, and a material comprising a resinous material such as olefin resin, and polyethylene terephthalate coated with each of such rubber materials. The gasket components 8, 9 may have a thickness suitably determined in consideration of the thickness of such a membrane-electrode assembly (MEA) as described later, for instance, selected from the range of 50 to 500 μm, and a width of, e.g., at least 1 mm.

Figure 7:
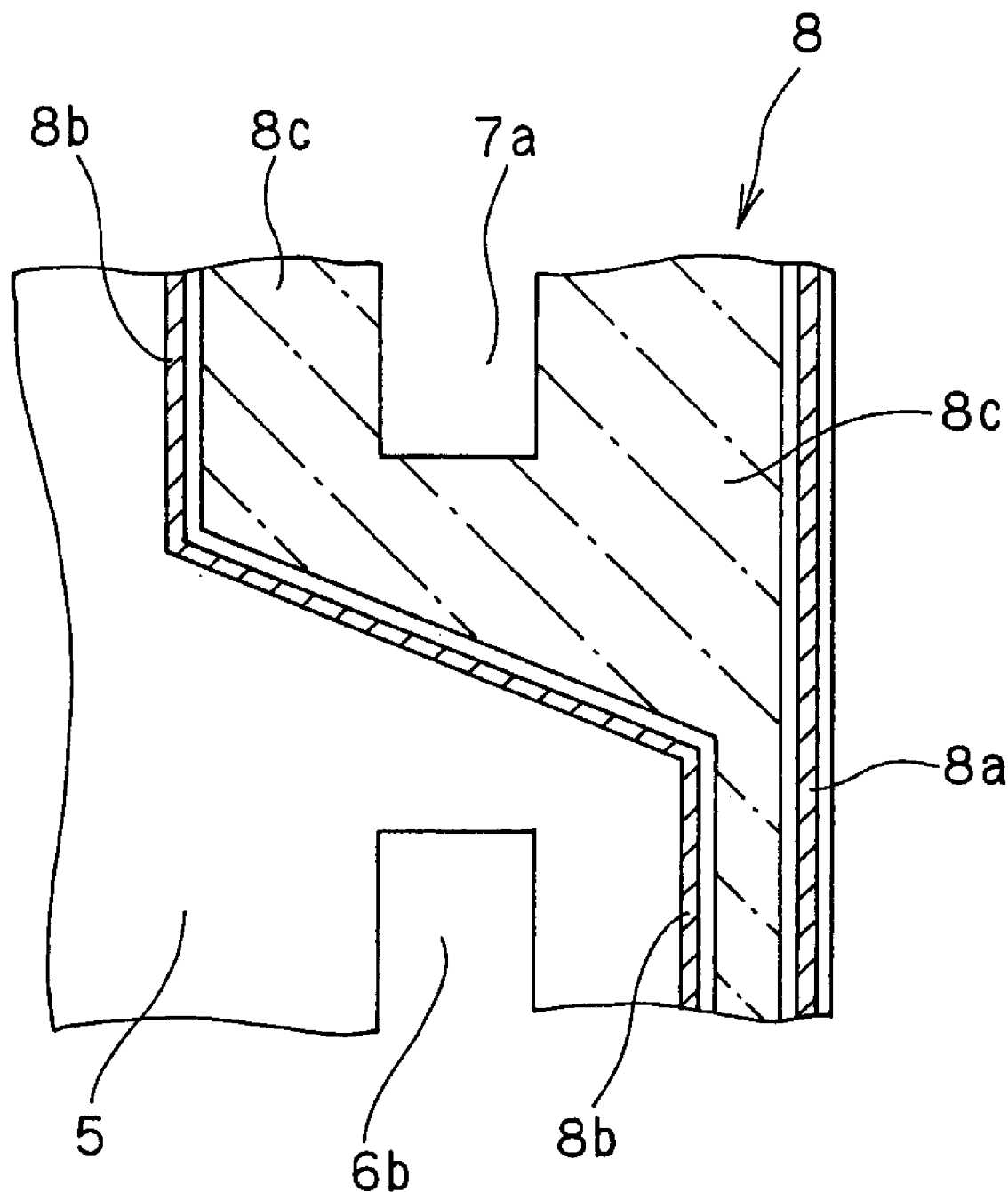
FIG. 7 is illustrative of one example of the gasket component; it is a partly enlarged plan view for a site marked off with a chain line in FIG. 1.

For the separator of the invention, the gasket components 8, 9 may each comprise a shim portion that is a height control member and a seal portion that is a gas leakage-preventive member; in this case, multiple such seal portions may be provided. FIG. 7 is illustrative of such an example, or FIG. 7 is a partly enlarged view for a site marked off with a chain line in FIG. 1. In the example of FIG. 7, the gasket component 8 comprises a double seal portion (a hatched site in FIG. 7) made up of an outer seal 8a and an inner seal 8b, with a shim portion 8c (a site indicated by a dotted chain line in FIG. 7) located halfway between the seals 8a and 8b. Thus, if the gasket component 8, 9 has a structure comprising the shim portion 8c that is a height control a member and the seals 8a, 8b that are a gas leakage-preventive member, it is then possible to improve tightness for the separator upon built in a polymer electrolyte type fuel cell. That tightness is further improved by the provision of multiple such seal portions. It here noted that FIG. 7 shows an example wherein the metal substrate 2 and resin layer 5 extend as far as the outside of the seal 8a, and that example is different from the example of FIG. 2 and FIGS. 4-6 in terms of the structure of the peripheral edge.

Such seals 8a, 8b and shim portion 8c may each be made of the material explained in conjunction with the aforesaid gasket components 8, 9. The seals 8a, 8b and the shim portion 8c may be made of different materials; in this case, it is preferable that the hardness of seals 8a, 8b is lower than that of the shim portion 8c.

The thickness of the seals 8a, 8b and the shim portion 8c may be suitably determined in consideration of the thickness of such a membrane-electrode assembly (MEA) as described later, for instance, selected from the range of 50 to 500 μm. The thickness of the seals 8a, 8b and the thickness of the shim portion 8c may be different; in this case, it is preferable that the thickness of seals 8a, 8b is larger than that of the shim portion 8c. The width of the seals 8a, 8b may be optionally set at, for instance, at least 0.3 mm, and the width of the shim portion 8c may be optionally set to, for instance, at least 0.3 mm.

Figure 8:
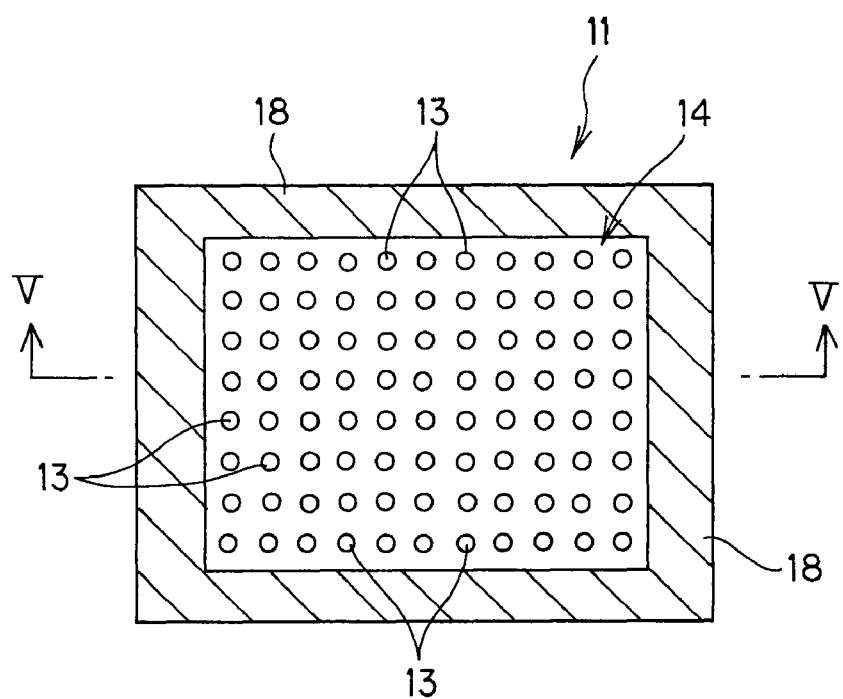
FIG. 8 is a plan view illustrative of another embodiment of the separator for fuel cells according to the invention.
Figure 9:
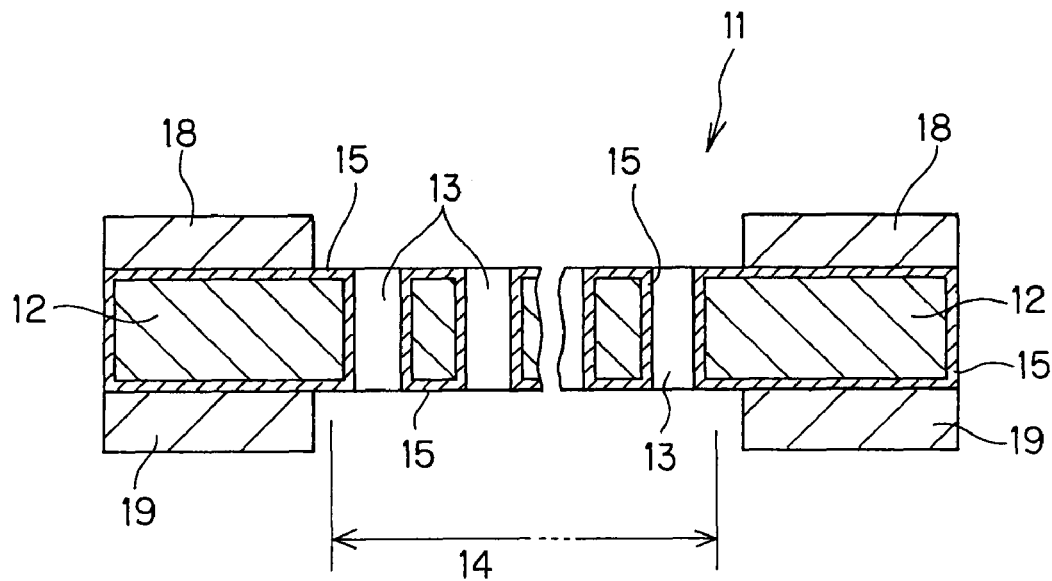
FIG. 9 is a partly enlarged sectional view of the separator of FIG. 8, as taken on line V-V.

FIG. 8 is a plan view illustrative of another embodiment of the separator for fuel cells according to the invention, and FIG. 9 is a partly enlarged sectional view of the separator of FIG. 8, as taken on line V-V. The separator 11 of the invention comprises a metal substrate 12, a plurality of through-holes 13 formed through the metal substrate 12, and a resin layer 15 formed by electrodeposition in such a way to coat both surfaces of the metal substrate 12 inclusive of the inner wall surfaces of such through-holes 13, and further comprises gasket components 18, 19 (indicated by hatches in FIG. 8) in an integral way. The aforesaid resin layer 15 contains an electrically conductive material, and the gasket components 18, 19 are positioned outside an area 14 with the aforesaid through-holes 13 formed in it.

The metal substrate 12 that forms a part of the separator 11 may be made of materials similar to that of which the aforesaid separator 1 is formed.

The through-holes 13 that the metal substrate 12 has are going to provide flow passages adapted to feed fuel gas or oxidizing agent gas to unit cells when the separator 11 is built in a fuel cell. There is no particular limitation to the size, number, and density of such through-holes 13.

The resin layer 15 that forms a part of the separator 11 has electrical conductivity, and is to provide the metal substrate 12 with corrosion resistance. The resin layer 15 may be formed by dispersing an electrically conductive material in a variety of anionic or cationic, synthetic polymer resins capable of electrodeposition to prepare an electrodeposition solution, forming it into a film by means of electrodeposition, and curing the film.

For the anionic or cationic synthetic polymer resin, use may be made of the synthetic polymer resins already mentioned with reference to the foresaid resin layer 5, which may be used in combination with a crosslinkable resin. To impart adhesiveness to the aforesaid synthetic polymer resin having electrodeposition capability, adhesiveness-imparting resins such as rosin resin, terpene resin, and petroleum resin may be added to it, if required. And, as is the case with the formation of the aforesaid resin layer 5 by electrodeposition, the synthetic polymer resins having electrodeposition capability are used for electrodeposition while they are neutralized by alkaline or acidic substances in such a way as to be dissolved or dispersed in water.

The resin layer 15 formed by electrodeposition may have a thickness of 0.1 to 100 μm, preferably 3 to 30 μm. As the thickness of the resin layer 15 is below 0.1 μm, it often renders it impossible to make sure good corrosion resistance due to the occurrence of pinholes or the like, and a thickness exceeding 100 μm is not preferable, because of such problems as the occurrence of cracking after drying and solidification, poor productivity, and added costs.

For the electrically conductive material contained in the resin layer 15, there is the mention of those contained in the aforesaid resin layer 5. The resin layer 15 may contain such a conductive material in an appropriate amount determined depending on the conductivity demanded for the resin layer 15, for instance, in an amount of 30 to 90% by weight.

The gasket components 18, 19 that form a part of the separator 11 are provided to prevent the fuel gas and oxidizing agent gas feeds from leaking out or being mixed together when the separator 11 is built in a fuel cell. Such gasket components 18, 19 are located on the peripheral edge of the separator 1 in such a way as to surround the center of the separator 11. In the embodiment shown, the gasket components 18, 19 are positioned outside the area with the through-holes 13 formed in it. The gasket components 18, 19 may be made of materials mentioned with reference to the aforesaid gasket components 8, 9, and their thickness and width may be determined as is the case with the aforesaid gasket components 8, 9.

Like the aforesaid gasket components 8, 9, the gasket components 18, 19 may each comprise a shim portion that is a height control member and a seal portion that is a gas leakage-preventive member; in this case, multiple such seal portions may be provided, as shown in FIG. 7. Such a seal or shim portion may be made of such similar materials as mentioned with reference to the aforesaid gasket components 8, 9, and their thickness and width may be determined as is the case with the aforesaid gasket components 8, 9.

Figure 10:
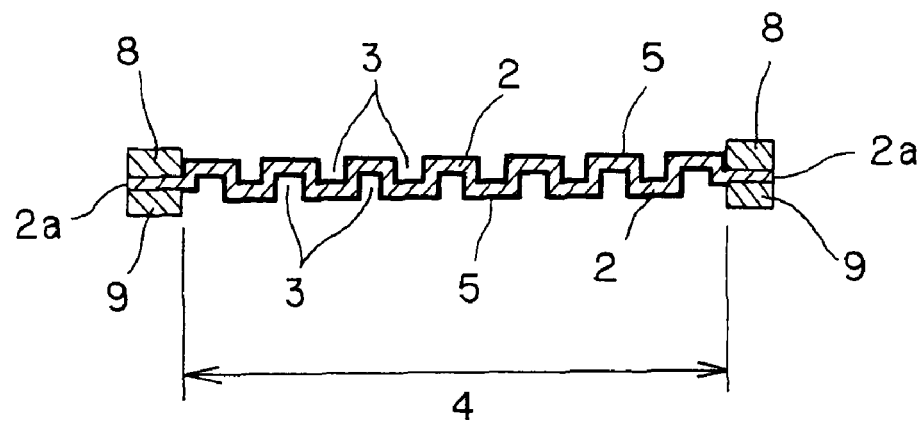
FIG. 10 is a sectional view of yet another embodiment of the separator for fuel cells according to the invention.

The aforesaid embodiments of the separator according to the invention are given by way of example alone but not by way of limitation. For instance, the separator of the invention may have the gasket components on one surface alone. A set of gasket components 8, 9 or 18, 19 may be located directly on the metal substrate 2 or 12 not through the resin layer 5 or 15. As shown typically in FIG. 10, the separator 1 may have the gasket components 8, 9 located directly on the metal substrate 2 without recourse to the resin layer 5, wherein the resin layer 5 is formed at only the area 4 with the grooves 3 formed in it while the side end 2a of the metal substrate 2 is exposed to view. As shown typically in FIG. 11, the separator 11 may have the gasket components 18, 19 located directly on the metal substrate 12 without recourse to the resin layer 15, wherein the resin layer 15 is formed at only the area 14 with the through-holes 13 formed in it while the side end 12a of the metal substrate 12 is exposed to view.

Such separator 1 or 11 helps cut back on material costs, because it is simply needed to form the resin layer 5 or 15 at only the area necessitating corrosion resistance (the area 4 or 14 with the grooves 3 or the through-holes 13 formed in it). Further, there is an increase in the adhesion of the gasket components 8, 9 or 18, 19 to the metal substrate 2 or 12. Furthermore, by forming the resin layer 5 or 15 at only the area of the fuel cell contributing to electricity production, it is possible to make a difference with an area not contributing to electricity production (an area where the gasket components 8, 9 or 18, 19 are positioned); a site (the side end 2a or 12a of the metal substrate 2 or 12) of the metal substrate 2 or 12 not coated with the resin layer 5 or 15 is allowed to function as a collector (terminal). As a result, there is much lower resistance achieved than could be possible in the presence of the electrically conductive resin layer 5 or 15, resulting in an improvement in electricity production capability. In the invention, it is understood that sites not coated with the resin layer 5 or 15 may exist, in addition to the aforesaid side end 2a or 12a, on the surface of the metal substrate 2 or 12 and inside or outside the area with the gasket components 8, 9 or 18, 19 formed in it. In the embodiment illustrated, the conductive resin layer 5 is not found between the gasket components 8, 9 and the metal substrate 2; however, the resin layer 5 may extend continuously from the area 4 with the grooves 3 formed in it and penetrate slightly between the metal substrate 2 and the gasket components 8, 9. In the separator 11, too, the conductive resin layer 15 may just as well penetrate slightly between the metal substrate 12 and the gasket components 18, 19.

[Exemplary Separator Fabrication]

Figure 12A:
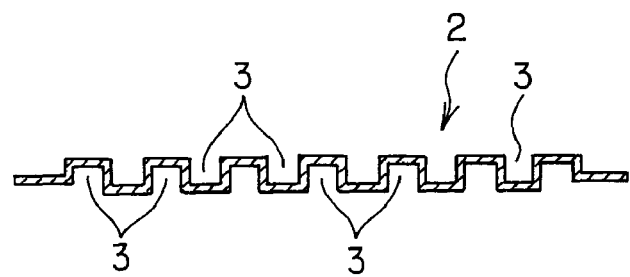
Figure 12B:
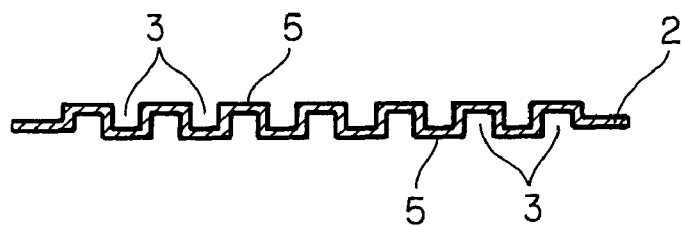
Figure 12C:
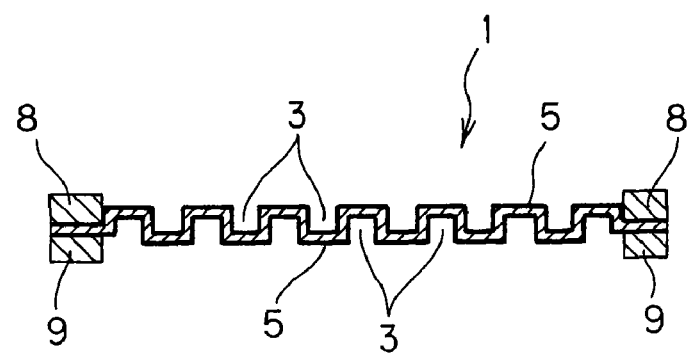

FIGS. 12A, 12B and 12C are illustrative of one example of how to fabricate the separator 1 of the invention shown in FIGS. 1-6. First, a metal sheet material is pressed to obtain the metal substrate 2 having grooves 3 in both its surfaces (FIG. 12A). In place of the aforesaid pressing technique, for instance, this metal substrate 2 may just as well be fabricated by a photolithography technique wherein resists are formed by photolithography in a desired pattern on both surfaces of a metal plate material, and such resists are used as masks to etch out the metal sheet material from both its sides to form the grooves 3.

Then, the resin layer 5 is formed on both surfaces of the metal substrate 2 (FIG. 12B). The resin layer 5 may be formed by forming a film by means of an electrodeposition technique using an electrodeposition solution having electrodeposition capability with an electrically conductive material dispersed in any one of various anionic, or cationic synthetic polymer resins having electrodeposition capability, and then curing that film. The thus formed resin layer 5 has a good electrical conductivity plus high corrosion resistance.

Then, the gasket components 8, 9 are formed at predetermined sites on both surfaces of the metal substrate 2 so that the separator 1 of the invention is obtained (FIG. 12C). For instance, the gasket components 8, 9 may be formed by a technique wherein film-form materials processed into the desired shape are applied onto the metal substrate 2 and cured; a screen or other printing technique wherein materials are printed into the desired shape and cured; and a technique wherein a coating solution is coated by a dispenser into the desired shape and cured.

Alternatively, when each gasket component comprises the seals 8a, 8 or a gas leakage-preventive member, and the shim portion 8c that is a height adjustment member as shown in FIG. 7, for instance, film-form materials processed into the desired shape are applied onto the metal substrate 2 and cured to form the shim portion 8c, and a coating solution is then coated by a dispenser and cured to form the seals 8a, 8b.

Figure 13A:
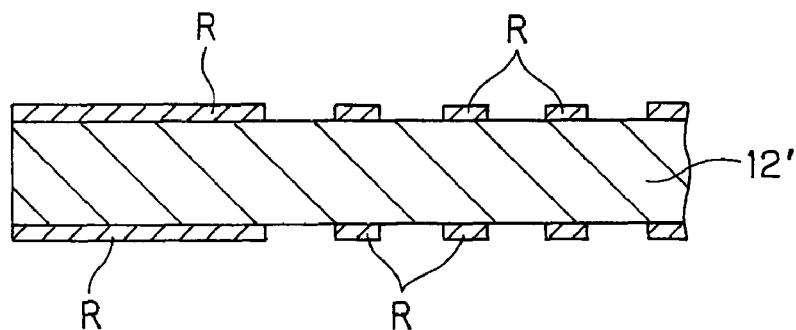
FIGS. 13A, 13B, 13C and 13D are illustrative of another fabrication process for the separator according to the invention.
Figure 13B:
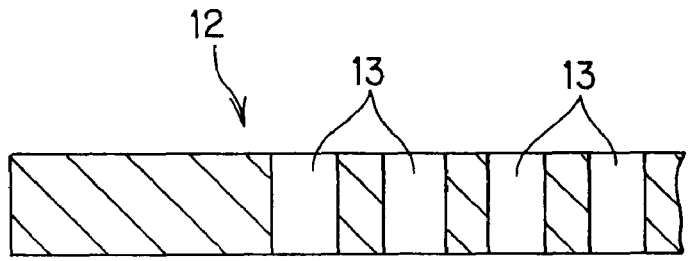

FIGS. 13A, 13B, 13C and 13D are illustrative of one example of how to fabricate the separator 11 shown in FIGS. 8 and 9. First, resists R, R are formed by photo-lithography on both surfaces of the metal plate material 12' in the desired pattern (FIG. 13A). Each resist R, R has a plurality of openings that are opposed to each other through the metal plate material 12'. Then, the resists R, R are used as masks to etch out the metal plate material 12' from both its surfaces to form a plurality of through-holes 13, and the resists R, R are thereafter stripped off to obtain the metal substrate 12 (FIG. 13B).

In place of the aforesaid etching technique, the through-holes 13 may just as well be formed by sandblasting, laser processing, drilling or other techniques.

Figure 13C:
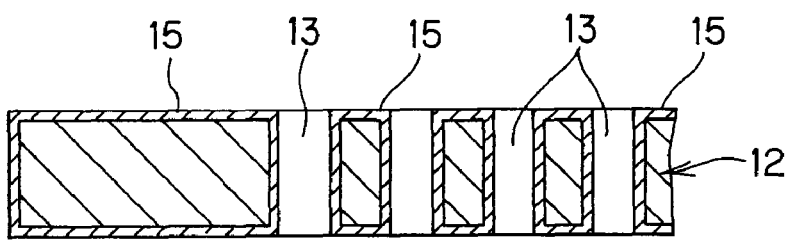

Then, the resin layer 15 is formed on the metal substrate 12 inclusive of the inner wall surfaces of the through-holes 13 (FIG. 13C). The resin layer 15 may be formed as is the case with the aforesaid resin layer 5.

Figure 13D:
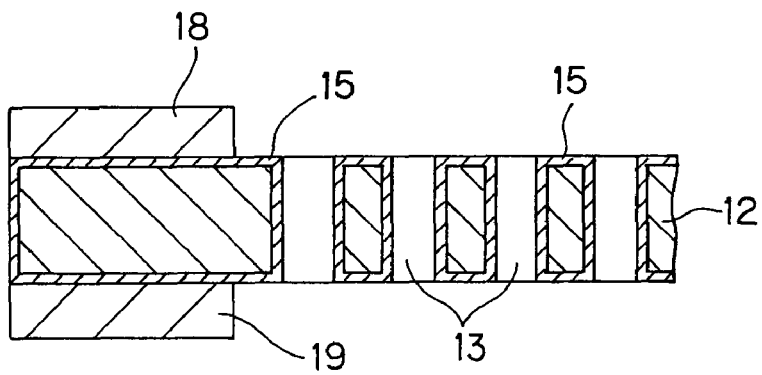

Then, the gasket components 18, 19 are formed on the predetermined sites on both surfaces of the metal substrate 12 so that the separator 11 of the invention is obtained (FIG. 13D). The gasket components 18, 19 may be formed as is the case with the aforesaid gasket components 8, 9.

Figure 11:
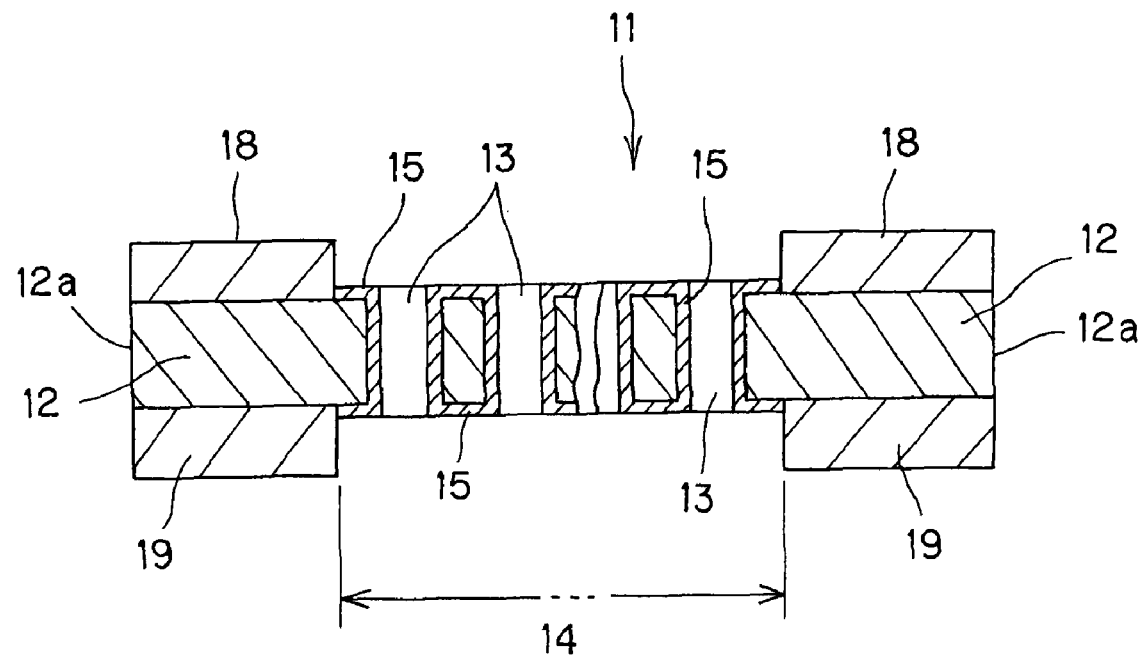
FIG. 11 is a sectional view of a further embodiment of the separator for fuel cells according to the invention.
Figure 14A:
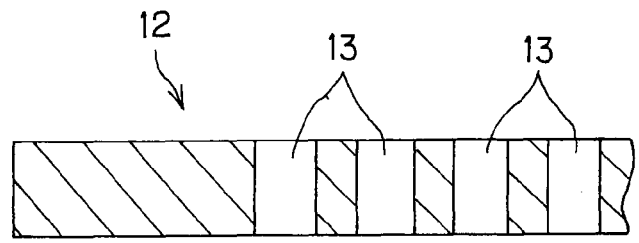
FIGS. 14A, 14B, 14C and 14D are illustrative of yet another fabrication process for the separator according to the invention.

FIGS. 14A, 14B, 14C and 14D are illustrative of another example of how to fabricate the separator 11 shown in FIG. 11. As explained with reference to FIGS. 13A and 13B, there is first the metal substrate 12 having a plurality of through-holes 13 obtained (FIG. 14A).

Figure 14B:
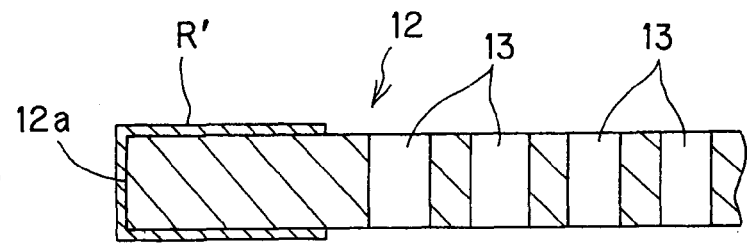

Then, an insulating pattern R' is formed at the sites on both surfaces of the metal substrate 12 where the gasket components 18, 19 are to be formed and the side end 12a (FIG. 14B).

Figure 14C:
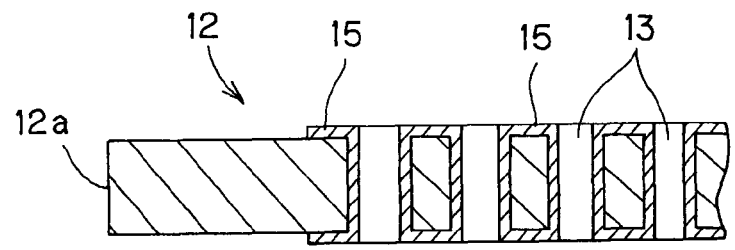

Then, the insulating pattern R' is used as a mask to form the resin layer 15 on the metal substrate 12 inclusive of the inner wall surfaces of the through-holes 13, followed by removal of the insulating pattern R' (FIG. 14C). The resin layer 15 may be formed as is the case with the aforesaid resin layer 5. It is here noted that without recourse to the formation of the insulating pattern R', an insulating jig may be compressed onto the sites on both surfaces of the metal substrate 12 where the gasket components 18, 19 are to be formed and the side end 12a, and the resin layer 15 is formed by electrodeposition in that state, followed by removal of that jig.

Figure 14D:
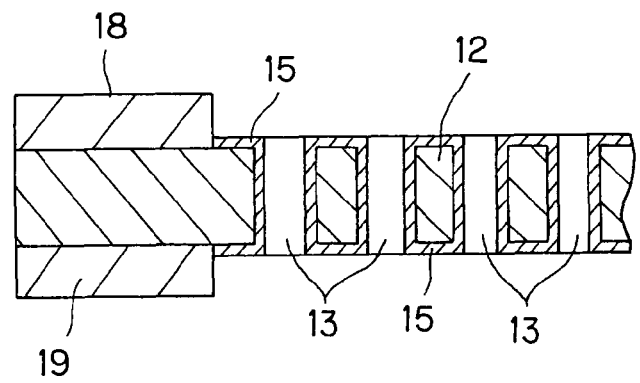

Then, the gasket components 18, 19 are formed at the predetermined sites on both surfaces of the metal substrate 12 on which there is none of the resin layer 15 so that the separator 11 of the invention is obtained (FIG. 14D). The gasket components 18, 19 may be formed as is the case with the aforesaid gasket components 8, 9.

The aforesaid fabrication processes are given by way of example alone, and so how to fabricate the separator of the invention is never limited to them.

The aforesaid embodiments of how to fabricate the inventive separator are given by way of example alone but not by way of limitation.

[Exemplary Fuel Cells Using the Separator of the Invention]

Figure 15:
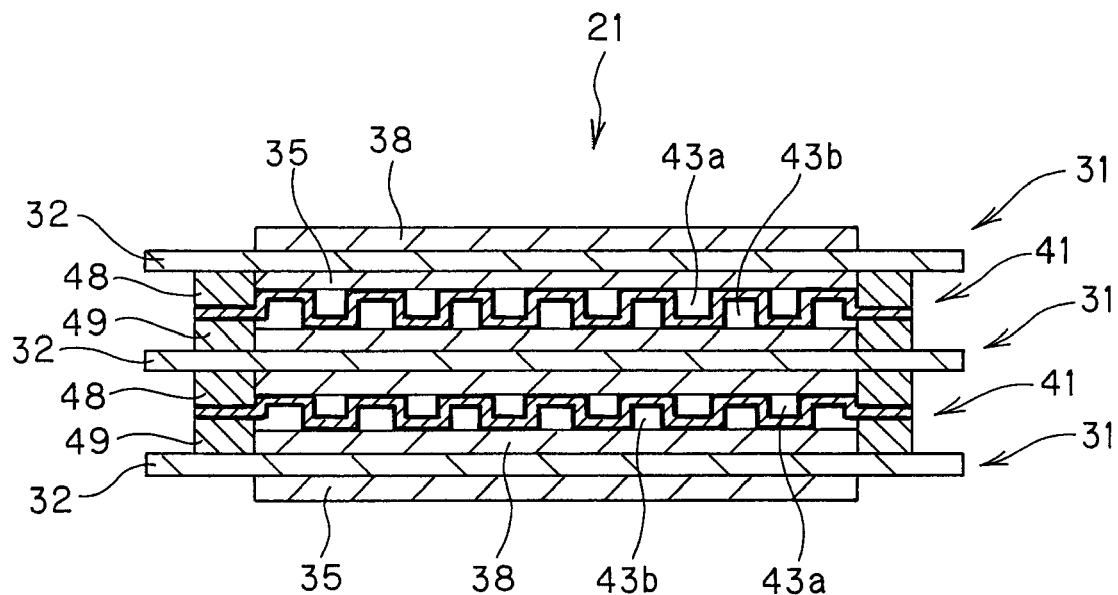
FIG. 15 is illustrative in partial construction of one exemplary polymer electrolyte type fuel cell using the inventive separator.
Figure 16:
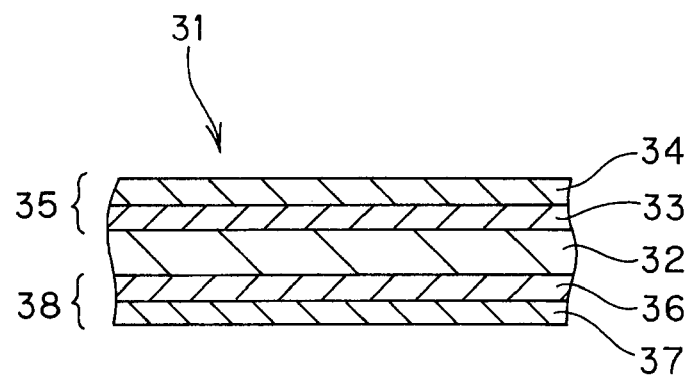
FIG. 16 is illustrative of a membrane-electrode assembly that forms a part of the polymer electrolyte type fuel cell depicted in FIG. 15.
Figure 17:
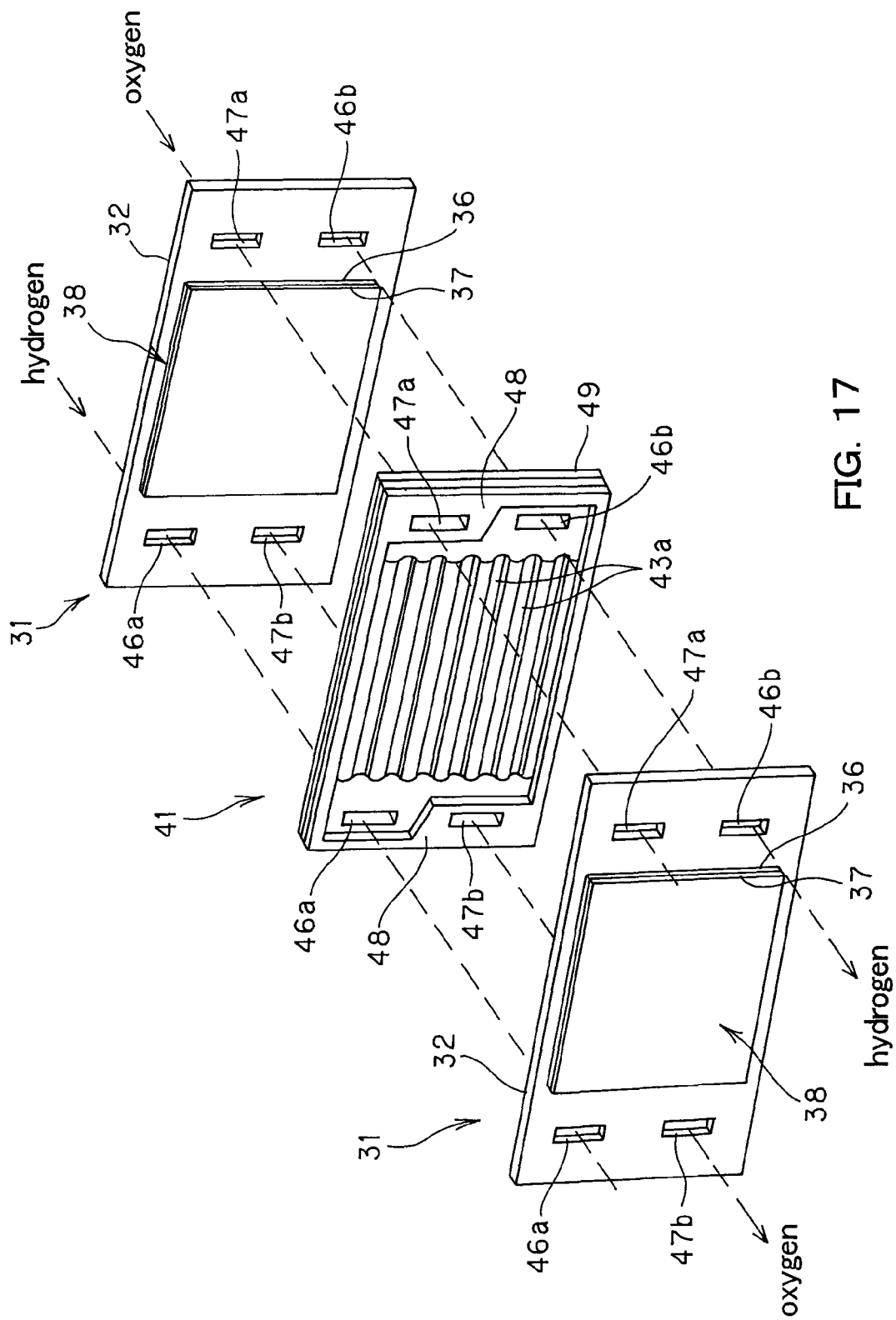
FIG. 17 is a perspective view of one state where the separator of the polymer electrolyte type fuel cell depicted in FIG. 15 is spaced away from the membrane-electrode assembly.
Figure 18:
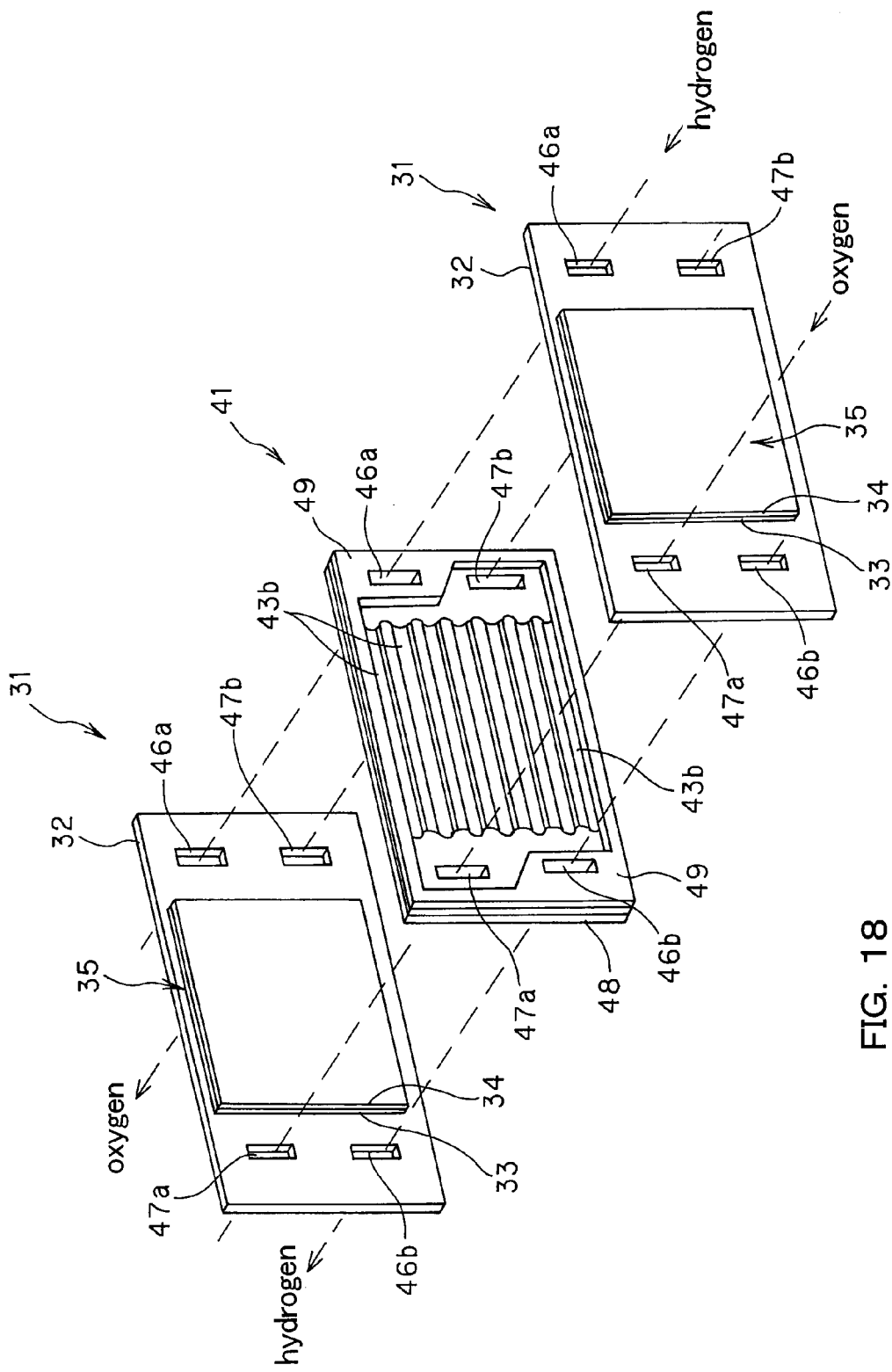
FIG. 18 is a perspective view of another state where the separator of the polymer electrolyte type fuel cell depicted in FIG. 15 is spaced away from the membrane-electrode assembly, as viewed in a different direction from that of FIG. 14.

One example of the polymer electrolyte type fuel cell using the separator of the invention is now explained with reference to FIGS. 15, 16, 17 and 18. FIG. 15 is illustrative in fragmental construction of the structure of the polymer electrolyte type fuel cell; FIG. 16 is illustrative of a membrane-electrode assembly that forms a part of the polymer electrolyte type fuel cell; and FIGS. 17 and 18 are perspective views of states where the separator of the polymer electrolyte type fuel cell is spaced away from the membrane-electrode assembly, as viewed from different directions.

In FIGS. 15-18, a polymer electrolyte type fuel cell 21 has a stack structure where membrane-electrode assemblies (MEA) 31 and separators 41 are alternately stacked into a plurality of unit cells that are stacked together.

As shown in FIG. 16, the MEA 31 has a fuel electrode (hydrogen electrode) 35 comprising a catalyst layer 33 and a gas diffusion layer (GDL) 34 located on one surface of a polymer electrolyte membrane 32 and an air electrode (oxygen electrode) 38 comprising a catalyst layer 36 and a gas diffusion layer (GDL) 37 located on another surface of the polymer electrolyte membrane 22. In the predetermined positions of the polymer electrolyte membrane 32, two fuel gas inlet holes 46a, 46b and two oxidizing agent gas inlet holes 47a, 47b are provided in the form of through-holes.

The separator 41 or the separator of the invention comprises a fuel gas feed groove 43a in one surface and an oxidizing agent gas feed groove 43b in another surface. On the surface with the fuel gas feed groove 43a formed in it, there is a gasket component 48 provided, which is positioned outside the area with the groove 43a formed in it and outside the two fuel gas inlet holes 46a, 46b (see FIG. 17). Further on the surface with the oxidizing agent feed groove 43b formed in it, there is a gasket component 49 provided, which is positioned outside the area with the groove 43b formed in it and outside the two oxidizing agent gas feed inlets 47a, 47b (see FIG. 18).

While there is such resin layer 5 as shown in FIG. 3 formed on both surfaces of the metal substrate forming the separator 41 having the fuel and oxidizing agent gas feed grooves 43a and 43b, that is not illustrated in the drawings.

Each separator 41 and MEA 31 are stacked together such that the fuel electrode (hydrogen electrode) of MEA 31 is in engagement with the surface of the separator 41 with the fuel gas feed groove 43a formed in it and the air electrode (oxygen electrode) 38 of MEA 31 is in engagement with the surface of the separator 41 with the oxidizing agent gas feed groove 43b formed in it. This stacking operation is repeated to set up the polymer electrolyte type fuel cell 21.

In the thus stacked state, the aforesaid two fuel gas inlet holes 46a, 46b define together a fuel gas feed passage that extends through in the stacking direction, and the two oxidizing agent gas inlet holes 47a, 47b define together an oxidizing agent gas feed passage that extends through in the stacking direction. And then, the MEA 31 is airtightly held between the gasket components 48 and 49 located in the separator 41.

According to the invention, there may be a polymer electrolyte type fuel cell having a cooling mechanism provided, wherein the separator of the invention is provided in one surface with a cooling water groove and in another surface with the fuel gas feed groove 43a or the oxidizing agent gas feed groove 43b, and cooling water inlet holes are each provided in each separator and the polymer electrolyte membrane.

Figure 19:
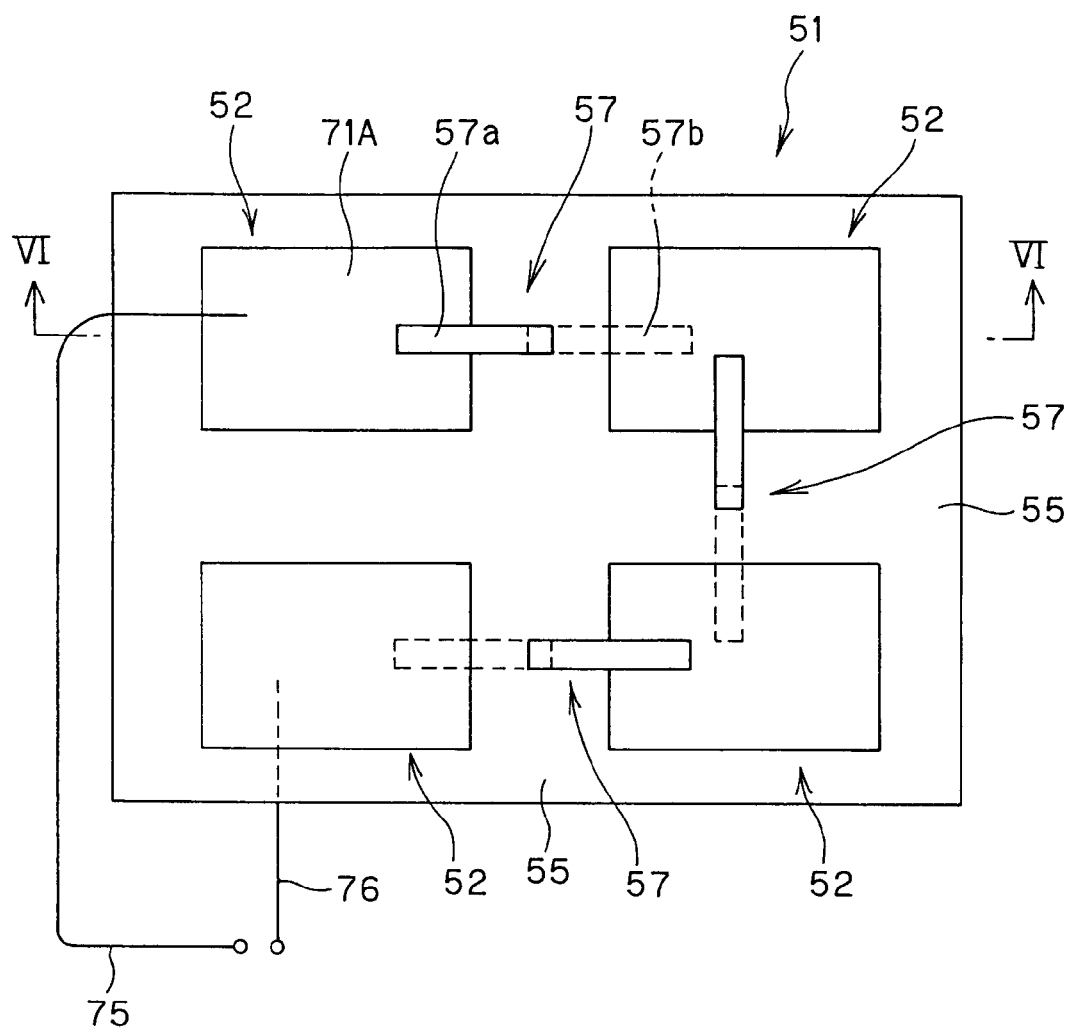
FIG. 19 is a plan view illustrative of another example of the polymer electrolyte type fuel cell using the inventive separator.
Figure 20:
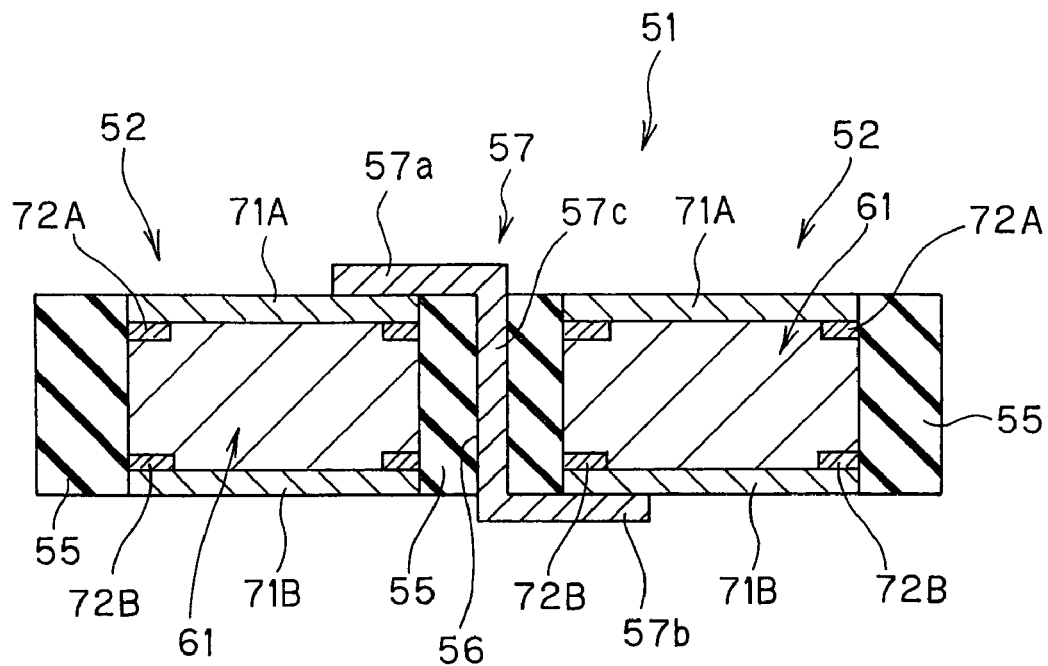
FIG. 20 is a longitudinal section of the polymer electrolyte type fuel cell of FIG. 19 as taken on line VI-VI.
Figure 21:
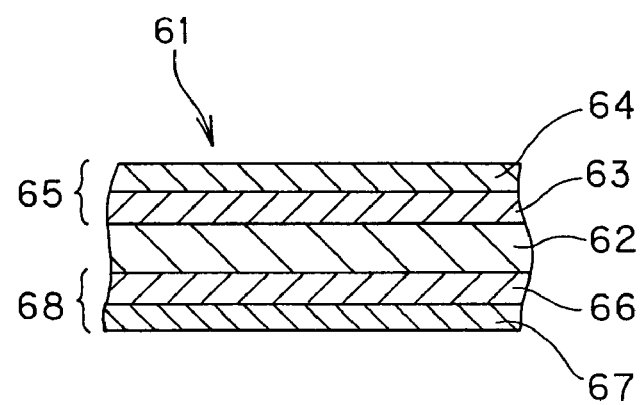
FIG. 21 is illustrative of the membrane-electrode assembly that forms a part of the polymer electrolyte type fuel cell of FIG. 19.

Another example of the polymer electrolyte type fuel cell using the separator of the invention is now explained with reference to FIGS. 19, 20 and 21. FIG. 19 is a plan view illustrative of another example of the polymer electrolyte type fuel cell using the inventive separator; FIG. 20 is a longitudinal section of the polymer electrolyte type fuel cell of FIG. 19 as taken on line A-A; and FIG. 21 is illustrative of the membrane-electrode assembly that forms a part of the polymer electrolyte type fuel cell.

As shown in FIGS. 19 and 20, the polymer electrolyte type fuel cell 51 is built up of a plurality of unit cells 52 arranged on a plane, each comprising a membrane-electrode assembly (MEA) 61 and separators 71A, 71B. These unit cells are electrically connected in series to draw out voltages corresponding to the number of unit cells (four in FIG. 19). Each unit cell 52 is provided around it with an insulating portion 55 having much the same thickness to configure the whole into a planar arrangement. More specifically, the unit cell 52 is fitted in a hollow in the flat plate-form insulating portion 55, thereby making it flush with the insulating portion 55.

In the polymer electrolyte type fuel cell 51, a through-connection 57c is extended through a part of the insulating portion 55 that is positioned between the adjoining unit cells to make a connection between the front and back surfaces of that portion 55. And then, that through-connection 57c is connected to one separator 71A (e.g., a fuel electrode-side separator) of the adjoining unit cells by way of a connecting wire 57a and to another separator 71B (e.g., an air electrode-side separator) by way of a connecting wire 57b, whereby there is an electrical series connection made between the adjoining unit cells. And then, wires 75, 76 are connected to the separator 71A of the unit cell 52 positioned at one series connected end and the separator 71B of the unit cell 52 positioned at another end.

While four unit cells are illustrated in the drawing, it is understood that there is no limitation to how many unit cells are installed.

The insulating portion 55 makes sure mutual insulation between the adjoining unit cells, yet it is connected to a connecting portion 57 (connecting wires 57a, 57b and through-connection 57c). Such insulating portion 55 may be made of a material including but being not limited to glass epoxy and polyimide resin, insofar as it is of good processability and durability. Furthermore, the insulating portion 55 may be composed of an insulating material alone, or partly contain an electrically conductive material.

For the through-connection 57c of the connecting portion 57, there may be one of a through-hole connection, a filled via connection or a bump connection formed in the insulating portion 55 positioned between the adjoining unit cells. The through-connection 57c may be formed by the application of a prior art wiring board technique.

As shown in FIG. 21, the MEA 61 includes a fuel electrode (hydrogen electrode) 65 comprising a catalyst layer 63 and a gas diffusion layer (GDL) 64 located on one surface of a polymer electrolyte membrane 62 and an air electrode (oxygen electrode) 68 comprising a catalyst layer 66 and a gas diffusion layer (GDL) 67 located on another surface of the polymer electrolyte membrane 62.

Each separator 71A, 71B is such an inventive separator as shown in FIGS. 8 and 9; it comprises a metal substrate having a plurality of through-holes and further containing an electrically conductive resin layer, and there is a gasket component 72A, 72B provided integrally outside the area with the through-holes formed in it.

The aforesaid fuel cells are given by way of example alone; the fuel cells incorporating the separator of the invention are never limited to them.

By way of example but not exclusively, the present invention is now explained in more details with reference to the following specific examples.

EXAMPLE 1

A 0.8 mm thick SUS304 (80 mm×80 mm) provided as a metal plate material was degreased on the surface.

Then, the SUS304 was pressed to prepare such a metal substrate having grooves as shown in FIGS. 1-6. In both surfaces of the metal substrate, 70 grooves per surface, each of 800 μm in width and 80 mm in length, were alternately located at a pitch of 1,200 μm. Each groove had a depth of 600 μm.

Then, the metal substrate was pretreated with a hydrochloric acid solution (9 parts of water plus 1 part of 35% hydrochloric acid added to it) of 50° C., followed by water rinsing.

Then, an electrically conductive material carbon black (Vulcan XC-72 made by Cabot Co., Ltd.) was dispersed in an epoxy electrodeposition solution in an amount of 75% by weight relative to solid resin matter to obtain an electrodeposition solution.

While that electrodeposition solution was held at 20° C. under agitation, the aforesaid metal substrate was dipped in it for a 1-minute electrodeposition at an inter-electrode distance of 40 mm and a voltage of 50 V, and pulled up from within. The metal substrate was rinsed with pure water, then dried in hot air by means of a dryer (150° C., 3 minutes), and then heat treated at 180° C. for a further 1 hour in a nitrogen atmosphere, whereby there was a 15 μm thick resin layer formed in such a way as to cover the metal substrate.

Then, an olefinic resin (made by Three Bond Co. Ltd.) was formed by die coating on a 0.25 mm thick polyethylene terephthalate film to form a laminated film for the formation of the shim portion. This laminated film was molded into such shape as shown in FIGS. 1 and 7, and after molding, the laminated film was applied onto the resin layer on both surfaces of the aforesaid metal substrate. Then, a fluororesin (made by Three Bond Co., Ltd.) was coated by a dispenser onto the inside and outside sites of the aforesaid laminated film for the formation of the shim portion with a gap of 200 μm. Thereafter, the assembly was heat treated at 180° C. for 1 hour, so that the shim portion (of 300 μm in thickness) was formed and a double-seal portion of 400 μm in width and 350 μm in thickness was formed on the inside, and the outside of that shim portion, thereby obtaining the separator of the invention.

Note here that the aforesaid epoxy electrodeposition solution was prepared as follows.

First, while 1,000 parts by weight of diglycidyl ether of bisphenol A (having an epoxy equivalent of 910) were kept at 70° C. under agitation, 463 parts by weight of ethylene glycol monoethyl ether were dissolved in it with a further addition of 80.3 parts by weight of diethylamine for a 2-hour reaction at 100° C., thereby preparing an amine-epoxy adduct (A).

On the other hand, 0.05 part by weight of dibutyltin laurate was added to 875 parts by weight of Colonate L (Nippon Polyurethane Co., Ltd., diisocyanate: 75% by weight nonvolatile matter of 13% NCO), which were then heated to 50° C. for the addition of 390 parts by weight of 2-ethylhexanol, whereupon they were allowed to react at 120° C. for 90 minutes. The obtained reaction product was diluted with 130 parts by weight of ethylene glycol monoethyl ether to obtain a component (B).

Then, a mixture of 1,000 parts by weight of the aforesaid amine-epoxy adduct (A) and 400 parts by weight of the component (B) was neutralized with 30 parts by weight of glacial acetic acid, and thereafter diluted with 570 parts by weight of deionized water to prepare a resin A with 50% by weight of nonvolatile matter. An epoxy electrodeposition solution was prepared by blending together 200.2 parts by weight of the resin A (with the content of the resinous component being 86.3 by volume), 583.3 parts by weight of deionized water and 2.4 parts by weight of dibutyltin laurate.

EXAMPLE 2

An aluminum alloy (A5052P) of 80 mm×80 mm in size and 0.8 mm in thickness provided as a metal plate material was degreased on the surface.

Then, a dry film resist (made by Nichigo-Morton Co., Ltd) was laminated on each surface of that aluminum alloy to form a 35 μm thick photosensitive resist layer. Thereafter, exposure (a 15-second irradiation with light from a 5 kW mercury lamp) was implemented via a photomask for the formation of grooves, and development (spraying of a 2% sodium hydrogencarbonate aqueous solution of 30° C.) was then carried out to form a resist.

Then, an aqueous solution of ferric chloride heated to 45° C. was sprayed onto the aluminum alloy from both its sides via the aforesaid resist for half etching down to the predetermined depth. Thereafter, the resist was removed off using a 5% sodium hydrogencarbonate aqueous solution, and the aluminum alloy washed to thereby obtain a metal substrate having a 1-mm wide, 0.3-mm deep groove of almost semicircular shape in section that meandered a length of 1,300 mm at an amplitude of 50 mm and a pitch of 2 mm.

Then, the aforesaid metal substrate was pretreated (for removal of an immobilized film) with an aqueous solution of nitric acid, followed by water rinsing.

Then, the aforesaid metal substrate was subjected to zinc replacement treatment under the following conditions to form a zinc alloy layer (of 0.05 μm in thickness) on the metal substrate inclusive of the grooves.

(Conditions for the Zinc Replacement)
The bath used: zincate bath (Armon EN made by Meltex Co., Ltd.);
The bath temperature: 30° C.; and
the treating time: 20 seconds.

Then, a 15 μm thick resin layer was formed on the zinc alloy layer, as in Example 1.

Then, a laminated film for the formation of the shim portion was prepared as in Example 1. The laminated film was then molded into a frame shape in such a way as to be positioned outside the area with the aforesaid grooves formed in it. After molding, the laminated film was applied onto the resin layer on both surfaces of the aforesaid metal substrate. Then, a fluororesin (made by Three Bond Co., Ltd.) was coated by a dispenser onto the inside and outside sites of the aforesaid laminated film for the formation of the shim portion with a gap of 200 μm. Thereafter, the assembly was heat treated at 180° C. for 1 hour, so that the shim portion (of 300 μm in thickness) was formed and a double-seal portion of 400 μm in width and 350 μm in thickness was formed on the inside, and the outside of that shim portion, thereby obtaining the separator of the invention.

EXAMPLE 3

A copper alloy (copper-tin-chromium) of 80 mm×80 mm in size and 0.8 mm in thickness provided as a metal plate material was degreased on the surface.

Then, a photosensitive material (a mixture of casein and ammonium bichromate) was formed by dip coating on each surface of that copper alloy to form a 2 μm thick coating film. Thereafter, exposure (a 60-second irradiation with light from a 5 kW mercury lamp) was implemented via a photomask for the formation of grooves, and development (spraying of warm water of 40° C.) was then carried out to form a resist.

Then, an aqueous solution of ferric chloride heated to 70° C. was sprayed onto the copper alloy from both its sides by way of the aforesaid resist for half etching down to the predetermined depth. Thereafter, the resist was removed off using a caustic soda aqueous solution of 80° C., and the copper alloy washed to thereby obtain a metal substrate having a 1-mm wide, 0.3-mm deep groove of almost semi-circular shape in section that meandered a length of 1,300 mm at an amplitude of 50 mm and a pitch of 2 mm.

Then, the aforesaid metal substrate was pretreated with sulfuric acid of 60° C. (1 part of sulfuric acid plus 5 parts of water added to it), followed by water rinsing.

Then, a 15 μm thick resin layer was formed on the metal substrate, as in Example 1.

Then, a laminated film for the formation of the shim portion was prepared as in Example 1. The laminated film was then molded into a frame shape in such a way as to be positioned outside the area with the aforesaid grooves formed in it. After molding, the laminated film was applied onto the resin layer on both surfaces of the aforesaid metal substrate. Then, an olefin resin (made by Three Bond Co., Ltd.) was coated by a dispenser onto the inside and outside sites of the aforesaid laminated film for the formation of the shim portion with a gap of 200 μm. Thereafter, the assembly was heat treated at 180° C. for 1 hour, so that the shim portion (of 300 μm in thickness) was formed and a double-seal portion of 400 μm in width and 350 μm in thickness was formed on the inside, and the outside of that shim portion, thereby obtaining the separator of the invention.

EXAMPLE 4

As in Example 2, grooves were formed in a 0.8 mm thick aluminum alloy (of 80 mm×80 mm in size) provided as a metal plate material to form a metal substrate.

Then, the metal substrate was subjected to pretreatment and zinc replacement treatment, as in Example 2. Thereafter, the periphery of the metal substrate was compressed and held with an insulating rubber jig in a frame configuration at a width of 3 mm from the side end, after which a 15 μm thick resin layer was formed as in Example 1. The thus formed resin layer was found at only a site not held by the aforesaid insulating rubber jig.

Then, a laminated film for the formation of the shim portion was prepared as in Example 1. The laminated film was then molded into a frame shape in such a way as to be positioned outside the area with the aforesaid grooves formed in it. After molding, the laminated film was applied onto both surfaces of the aforesaid metal substrate. Then, an olefin resin (made by Three Bond Co., Ltd.) was coated by a dispenser onto the inside and outside sites of the aforesaid laminated film for the formation of the shim portion with a gap of 200 μm. Thereafter, the assembly was heat treated at 180° C. for 1 hour, so that the shim portion (of 300 μm in thickness) was formed and a double-seal portion of 400 μm in width and 350 μm in thickness was formed on the inside, and the outside of that shim portion, thereby obtaining the separator of the invention. In this separator, the metal substrate was exposed to view at the boundary site between the side end and the shim and seal portions, and at the outside site of the gasket component comprising the shim and seal portions.

What is claimed is:
1. A separator for fuel cells, comprising:
a metal substrate;
an electrically conductive resin layer formed by electro deposition in such a way as to cover said metal substrate; and
a gasket component including a shim portion that is a height adjustment member and at least one seal portion that is a gas leakage-preventive member, the shim portion being separate from the at least one seal portion, wherein
a hardness of the at least one seal portion is lower than a hardness of the shim portion, a thickness of the at least one seal portion is larger than a thickness of the shim portion, and said resin layer contains an electrically conductive material.

2. The separator for fuel cells according to claim 1, wherein said resin layer is interleaved between said gasket component and said metal substrate.

3. The separator for fuel cells according to claim 1, wherein none of said resin layer is interleaved between said gasket component and said metal substrate, and said metal substrate is exposed at a side end.

4. The separator for fuel cells according to claim 1, wherein said metal substrate is made of any one of stainless steel, iron, an iron-nickel alloy, aluminum, an aluminum alloy, copper, a copper alloy, titanium, a titanium alloy, magnesium, and a magnesium alloy.

5. The separator for fuel cells according to claim 1, wherein said electrically conductive material is at least one of a carbon particle, a carbon nanotube, a carbon nanofiber, a carbon nanohorn, and a corrosion-resistant metal.

6. The separator for fuel cells according to claim 1, wherein multiple seal portions are provided.

7. The separator for fuel cells according to claim 1, wherein said metal substrate has a groove in at least one surface, and said gasket component is positioned outside an area with said groove formed therein.

8. The separator for fuel cells according to claim 7, wherein said resin layer is interleaved between said gasket component and said metal substrate.

9. The separator for fuel cells according to claim 7, wherein none of said resin layer is interleaved between said gasket component and said metal substrate, and said metal substrate is exposed at a side end.

10. The separator for fuel cells according to claim 7, wherein said metal substrate is made of any one of stainless steel, iron, an iron-nickel alloy, aluminum, an aluminum alloy, copper, a copper alloy, titanium, a titanium alloy, magnesium, and a magnesium alloy.

11. The separator for fuel cells according to claim 7, wherein said electrically conductive material is at least one of a carbon particle, a carbon nanotube, a carbon nanofiber, a carbon nanohorn, and a corrosion-resistant metal.

12. The separator for fuel cells according to claim 1, wherein said metal substrate has a plurality of through-holes, and said gasket component is positioned outside an area with said through-holes formed therein.

13. The separator for fuel cells according to claim 12, wherein said resin layer is interleaved between said gasket component and said metal substrate.

14. The separator for fuel cells according to claim 12, wherein none of said resin layer is interleaved between said gasket component and said metal substrate, and said metal substrate is exposed at a side end.

15. The separator for fuel cells according to claim 12, wherein said metal substrate is made of any one of stainless steel, iron, an iron-nickel alloy, aluminum, an aluminum alloy, copper, a copper alloy, titanium, a titanium alloy, magnesium, and a magnesium alloy.

16. The separator for fuel cells according to claim 12, wherein said electrically conductive material is at least one of a carbon particle, a carbon nanotube, a carbon nanofiber, a carbon nanohorn, and a corrosion-resistant metal.

* * * * *